Figure 1:
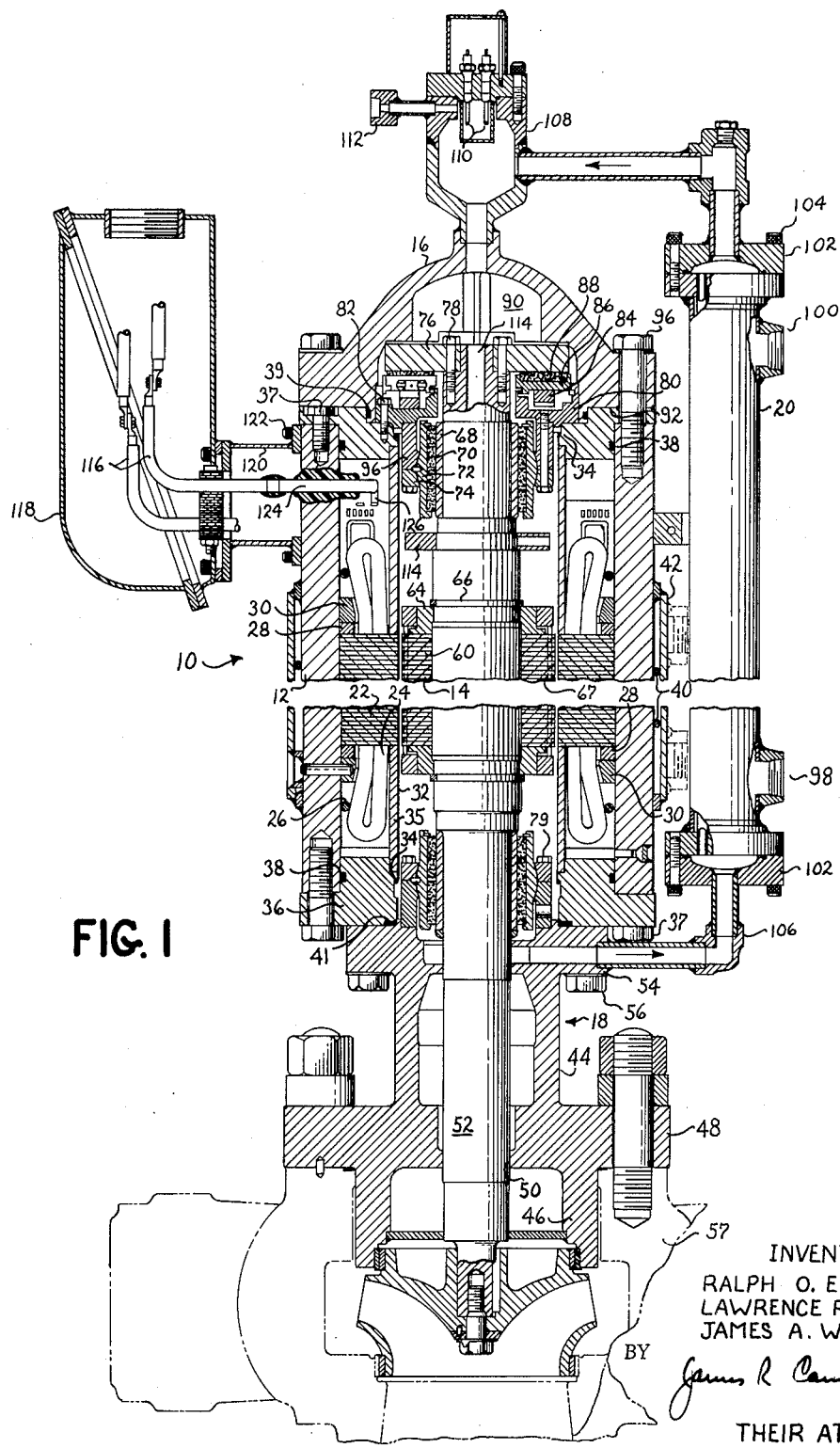

INVENTORS
RALPH O. EIS
LAWRENCE R. TOMHAVE
JAMES A. WALSH
BY *James R Campbell*
THEIR ATTORNEY

United States Patent Office

3,218,490
Patented Nov. 16, 1965

3,218,490
LIQUID COOLED MOTOR
Ralph O. Eis, Lawrence R. Tomhave, and James A. Walsh, Schenectady, N.Y., assignors to General Electric Company, a corporation of New York
Filed Dec. 4, 1962, Ser. No. 242,272
8 Claims. (Cl. 310—54)

The invention described herein relates to dynamoelectric machines and more particularly to a liquid cooled motor having its stator enclosed in a fluid impervious shell.

Motors of the general type disclosed herein are commonly referred to as "canned motors" which find particular usage in boiler water circulator pump applications and in nuclear installations where the motor drives a pump used in circulating high pressure-temperature water in separate heat absorbing and transmission systems. The design of such motors essentially consists of enclosing both the stator and rotor magnetic cores in steel shells and circulating the liquid coolant through the motor air gap, the shells serving the function of preventing such coolant from contacting the motor windings.

Since the motor internal cavities are subjected to liquid presures in the neighborhood of 2500–4000 p.s.i., heavy structural flanges and welds are employed both for maintaining alignment of the parts and preventing their distortion which otherwise may cause liquid leakage into the electrically energized components. Although such designs are satisfactory and motor performance reasonably high, major problems of disassembly and reassembly are encountered when it becomes necessary to replace one or more major components, such as a stator. In such instances, the heavy welds must be broken during disassembly and in the usual case, those parts which were welded must also be replaced because of the damage sustained during weld removal. Usually, the complete motor must be dismantled from the system and returned to the factory for repair since the parts require high precision machinery prior to application of the weld material. Unless the customer or user has a spare motor, the system served by the motor must be shut down during the repair period. The motor unit therefore is not flexible and both the labor and material costs reach high proportions compared to the defective part being replaced.

The use of heavy welds for joining various parts not only results in disadvantages during part replacement operations but also during the initial manufacture of the motor. At that time, the parts being joined must be machined to close tolerances and special weld procedures must be followed to assure the obtaining of welds having a high degree of integrity. After welding, inspection by X-ray, hydrostatic testing and other examinations must be carried out, thus adding materially to the labor costs which must be reflected in the total cost of the motor. Although the disadvantages connected with welding during motor manufacture can be handled reasonably, the major problems described above appear after the motor is installed as part of a system, and replacement of a wornout or damaged component becomes necessary.

The primary object of our invention therefore is to provide a liquid cooled motor capable of being dismantled after installation in a system without having to break welds or other members permanently joining parts of the motor together.

Another object of our invention is to provide a motor having the same or greater reliability and performance as present motors but with greater flexibility in design at lower cost.

Still another object of our invention is the provision of a motor design wherein some individual components in the motor may be removed and replaced without removing the motor from the system being served.

In carrying out our invention, we provide a liquid cooled motor of the type having at least the stator enclosed in a fluid impervious shell, and wherein the several major motor components are all held together by bolts to facilitate their individual removal when necessary without having to break welds or other structures used in permanently joining the motor parts. The design of such individual motor components is especially chosen to permit their individual removal and replacement without having to disturb other parts associated therewith. It will be apparent to those skilled in the art that the design disclosed herein will impart extreme flexibility to the complete motor combination while simultaneously permitting obtaining substantial reduction in the motor manufacturing costs.

Figure 2:
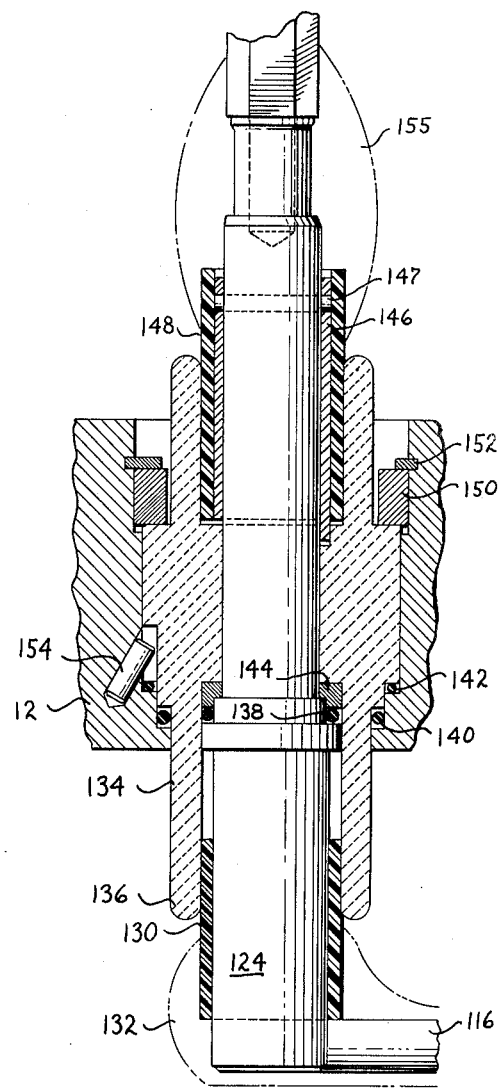

While the specification concludes with claims particularly pointing out and distinctly claiming the subject matter which we regard as our invention, it is believed the invention will be better understood from the following description taken in connection with the accompanying drawing wherein:

FIGURE 1 is a view in elevation, partly in section, of a canned motor illustrating the disposition and arrangement of the several motor components; and FIGURE 2 is a cross-sectional view in elevation of a lead seal used in conducting leads through a high pressure vessel into the motor.

Referring now to the drawings wherein like reference characters designate like or corresponding parts throughout the several views, there is shown in FIGURE 1, a canned motor generally comprising a stator 10 enclosed in pressure containing stator shell 12, and a rotor 14 arranged for electrodynamic cooperation therewith. A top closure 16 closes the upper end of the motor while a pump adapter 18 closes the bottom end thereof. A heat exchanger 20 cools the liquid coolant adapted for circulation through the motor to remove heat generated during operation.

Each of the stator 10, stator shell 12, rotor 14, top closure 16, pump adapter 18 and heat exchanger 20 comprise the major components or building blocks of a complete motor. Each of these components or blocks are specifically designed for removal and replacement as a separate entity without having to disturb to any substantial degree, the other components comprising the motor. Another significant aspect of the invention which will become apparent as the description proceeds, is such components are all joined together into an integral motor unit without the use of welds or other structural members whose normal function is to hold or join the components together. Bolts are used throughout, thus permitting the user to replace any part without disturbing other components in the combination.

Referring more specifically to the parts, it will be seen the stator 10 comprises a multiplicity of stacked laminations 22 having a winding 24 disposed in slots in a conventional manner. A steel or resin treated glass fibrous ring 26 is secured to the outer peripheral portions of the winding end turns to prevent their displacement when subjected to magnetic and vibratory forces. The laminations 22 are held under compression by the combined effort of a finger flange 28 and finger flange support ring 30 disposed on opposite ends of the stator and in a manner well known in the art.

Since it is necessary to furnish watertight integrity to the stator windings, a thin corrosion resistant can or shell 32 is expanded into intimate contact with the lamination surfaces forming the stator bore and welded at 34 respectively to a pair of can support rings 36 disposed at opposite ends of the stator in the manner shown. This is the only weld made in the motor and is one which one would never expect to break throughout the complete life of the stator. The pair of upper and lower can support rings 36 are located axially outward from the winding end turns and equipped with machined surfaces for engagement by cylindrical can support extensions 35, the upper surface of adapter 18 at the bottom and top closure 16 at the top of the motor, and coacting surfaces of the stator shell 12, as illustrated. O-rings 38 and the weld 34 effectively serve to resist the infiltration of liquid or other contaminants into the cavity housing the end turns. O-ring 39 and gasket 41 preclude leakage of high pressure liquid out of the motor. The upper and lower can support rings 36 are secured to the stator shell by bolts 37 and therefore comprise an integral part of the stator assembly. These bolts remain with the stator when it is removed from the motor.

The electrical rating of the motor can be increased if desired by circulating a coolant in heat exchange relationship with the outer surface of the stator shell. This may be accomplished in any one of several ways and a preferred form includes welding or otherwise securing a ribbon of steel 40 around the stator shell to form a helix. A cylinder 42 is then placed over the steel ribbon and welded at its ends to projections on the shell. The space thus formed between the cylinder 42 and stator shell 12 constitutes a helical passageway for the circulation of liquid coolant from one end of the motor to the other.

It will be apparent the stator assembly comprises a single entity which can be removed and replaced on a unit at will.

Prior constructions of this type motor included heavy flanges usually formed integral with the stator shell for joining the motor to a pump housing. The motor therefore was suitable for use with only one size and design of pump, and the two were not interchangeable with other motors and pumps, thus eliminating flexibility in adapting one size motor to a different size or design of pump. Moreover, since the pump housing was in contact with the high temperature water circulated, substantially unimpeded heat flow took place from the housing into its attached pump flanges, then directly to the motor flanges and the motor stator, thus causing the motor to operate at a much higher temperature level. The lack of an effective thermal barrier between the pump and motor therefore required a design of motor cooling system effective in handling the additional heat imparted thereto from the pump during operation.

We eliminate the disadvantages described above by utilizing an adapter 18 which serves both functions of adapting different size motors to different size standard pumps and of establishing a barrier to the flow of heat into the motor. The adapter 18 comprises a pair of axially extending cylindrical members 44 and 46 joined by a central flange 48 which includes a surface 50 forming a close running clearance with the shaft for limiting interchange of water between the motor and pump in this area. Support for the stator is provided by an outward extension of ring 54 having holes for a multiplicity of bolts 56 which extend into the lower can support 36. Central flange 48 integral with the adapter has bolt hole openings for securing the adapter and therefore the motor to a pump housing 57. It will be noted an effective heat barrier is established by making the axial member 44 of relatively long length and of minimum cross-section dimensions. This design spaces the pump from the lower portions of the motor to provide an area through which air may circulate to carry away heat by convection. Heat conduction to the motor also is minimized by the relatively long section used. Since the cross-sectional area is small, a direct limitation is placed on the amount of heat which may be conducted to the motor.

It is obvious the extension of ring 54 and flange 48 may be made of different size to accommodate different size motors and pumps. However, the relative length of portions 44 and 46 should be maintained for minimizing heat transfer to the motor.

In addition to providing an effective barrier to the flow of heat to the motor and in adapting the motor to different size pumps, the adapter furnishes extreme flexibility to the motor-pump combination. Since it constitutes a separate major component, it conveniently may be removed to repair the lower guide bearing and in separating the motor from the pump, and vice versa, when repair to either of these devices must be made.

The rotor 14 is of a design conventionally used in this type of motor and includes a multitude of stacked laminations 60 having slots for receiving copper conductor bars or a cast squirrel cage winding. A flange 64 held in place by ring 66 fitted on shaft 52, firmly holds the laminations under compression. The rotor outer surface may selectively be equipped with a can or shell 67, and if one is used, a small seal weld is applied between the can terminal ends and a plate positioned at the end of the lamination stack as in usual constructions.

The shaft rotates in water lubricated carbon or graphite guide bearings also according to well known practices. The shaft preferably is equipped at each end with a sleeve 68 having a journal surface of hard material compatible with the graphite type bearing shells 70. The shells are held in place by self-aligning bearing housings 72 and bearing supports 74 attached at the lower end of the motor to adapter 18 by bolts 79 and at the upper end to a thrust bearing cage 80.

The water lubricated thrust bearing located in the upper end of the motor comprises a runner 76 rigidly fixed to shaft 52 by bolts 78. A thrust bearing cage 80 immovably held to the upper can support 36 by bolts 82 contains the usual rockers and linkages 84, and shoes 86 used for positioning carbon bearing pads 88 in intimate contact with the thrust runner surface.

The thrust runner 76, thrust bearing 80 and the top guide bearing may be removed after removing the top closure 16 which is held in place by bolts 96. The stator assembly may then be removed after removal of bolts 56 without disturbing the other major motor components.

Top closure 16 merely comprises a cover having internal surfaces shaped to provide an air collecting chamber 90 and to receive the thrust runner and other associated bearing elements. An annular shoulder 92 machined on the closure inner surface is designed to coact with a complementary surface on the upper can support 36. O-ring 39 positioned between the mating surfaces prevents seepage of high pressure water outwardly from the motor cavities. O-rings 39 therefore are the only seals necessary in the upper portion of the motor to prevent escape of liquid from the motor. The top closure is held securely on stator shell 12 by a multitude of bolts 96 which are spaced around the closure.

It will be noted bolts of two sizes are used. Small bolts 37 are employed to hold the upper can support 36 to stator shell 12 and these may be of small size since they are not subjected to the total internal pressures of liquid in the motor cavities. They act to hold the parts together for permitting removal of the stator as a unit and to carry part of the hydrostatic force if water enters the stator cavity. The large bolts 96 fasten the top closure to the stator shell and are of sufficient size along with bolts 37 to withstand the maximum force expected to be applied to the top closure, and the can support in the event of leakage into the stator, during motor operation.

After installation of the above described motor in a system, high pressure-temperature liquid, usually water, is permitted to seep from the pump through the close running clearance at 50 prior to entry into all motor cavities, except the stator cavities. This arrangement is used since known seals cannot assure absolute confinement of water to the pump, particularly in those systems where the possibility exists the water may become radioactive. The subsequent interchange of water between the pump and the motor through clearance 50 is so slight however, that such water may be cooled in the heat exchanger 20 and then circulated through the motor to carry away heat generated therein during operation. Supplementary cooling means consisting of circulating water through the helical passages formed by ribbon 40 and jacket 42 may be resorted to as previously described.

The heat exchanger 20 is designed for separate removal without disturbing the other motor components. Its internal passages may consist of conventional tubes or other elements arranged such that low pressure cooling water flows through inlet 98 and either through or around the tubes prior to discharge through outlet 100. Hot water from the motor preferably is circulated downwardly through the heat exchanger and in a closed path with the motor.

Support for the heat exchanger is provided by a pair of flanges 102 at the upper and lower ends of the motor to which the heat exchanger is attached by bolts 104. Pipes 106 are welded to the flange and adapter 18 and constitute an integral part of the adapter component. The flange and pipes at the top of the motor likewise are integrally joined with the housing of air detector 108 and need not be separately removable therefrom because of the permanently welded construction provided.

The air detector 108 consists of a housing enclosing a pair of probes 110 which form a closed circuit with a solenoid actuated or other conventional device not shown, and water from the motor. If air enters the system and displaces water from the upper portion of the housing to expose the probes, the circuit is broken and an alarm or other warning device is actuated to indicate the existence of air in the system. It then is merely bled off through vent 112.

The high temperature-pressure water circulation system includes a pump 114 mounted on the rotor shaft to move the water at a desired speed. It flows in a path from the top of the heat exchanger 20, air detector 108 and through the shaft to the pump 114. Discharge from the pump is downwardly through the lower guide bearing and out pipe 106 for return to the heat exchanger with some flow upwardly through upper guide bearing and thrust bearing. As previously mentioned, low pressure cooling water flows downwardly through the heat exchanger for absorbing heat from the high pressure system.

Electric power to the stator winding is supplied through a plurality of conductor leads 116 enclosed in a conduit box 118 attached to the stator shell by an extension 120 and bolts 122. Each lead is brazed or otherwise attached to a copper stud 124 mounted immovably in the stator shell in such manner as to resist high pressure forces which would act to displace it outwardly in event of failure of the stator assembly. The conductors extending from each stud are connected to coil leads 126 of the winding in a conventional manner and are shown schematically in the drawing.

Referring more specifically to FIGURE 2 illustrating the conductor seal, each conductor lead 116 is brazed to each stud 124 and a cylindrical insulator 130 of mica-resin, Textolite, Bakelite or other product is positioned over the stud and the assembly wrapped with glass or other insulating tape 132. A ceramic insulator 134 having an end 136 projects outwardly to partially encompass a portion of insulator 130. The main body of ceramic insulator 134 is positioned within the wall of the stator shell 12 and is equipped with surfaces designed to contact the shell wall and the stud outer surface. Shoulders are formed on the insulator 134 to accommodate O-rings 138 and 140 which prevent fluid leakage from the stator assembly in the event of can failure and leakage thereinto from the motor cavities. A metal ring 144 is located inwardly of O-ring 138 to facilitate its removal when necessary. The primary function of O-ring 142 is to prevent cracking of the ceramic insulator 134 when subjected to vibratory forces encountered during motor operation.

A metal sleeve 146 is held to the stud by a dowel pin 147 and an insulator 148 of mica-resin, Textolite, or the like, is positioned over the metal sleeve. The complete unit is held in the stator shell walls by a metal ring 150 secured in place by a snap ring 152.

In order to prevent rotation of the seal elements within the shell wall, the metal sleeve 146 is restricted in rotary movement with respect to the stud by dowel pin 147. The lower end of sleeve 147 is equipped with a tongue designed to engage a groove formed in the ceramic insulator 134 which effectively prevents relative rotation between the sleeve and ceramic insulator. To limit movement of insulator 134 in the wall, an opening is formed in the stator shell wall to accept pin 154 of sufficient length to extend into a groove formed in the ceramic insulator.

The particular advantages which flow from utilizing the seal described above is any element thereof may quickly and easily be replaced without having to replace the whole seal. The parts are not bonded or joined to one another by tape or other means. The only steps necessary for replacing any part is simply that of removing insulating tape 155 from the connection and removing snap ring 152. The seal assembly may then be lifted from the stator shell wall and upon disassembly and replacement of one or more parts, positioned again in the wall by reversing the steps which effected removal.

The particular benefits to be derived by a user of the motor disclosed herein is each of the major components may be removed and replaced in the field without having to disturb the other components to any great extent. The design does not include any structural welds which need be broken when any one component is replaced because bolts are employed for joining the components into an integral unit. The particular design chosen therefore permits extreme economy in both manufacture and maintenance while also inherently containing sufficient flexibility to accommodate changing individual components in the field.

In view of the above, it will be apparent that many modifications and variations may be resorted to by those skilled in the art. It therefore is to be understood that within the scope of the appended claims, the invention may be practiced other than as specifically described.

What we claim as new and desire to secure by United States Letters Patent is:

1. A liquid cooled motor comprising a stator having a winding hermetically sealed in a pressure vessel, a rotor in said stator including a shaft adapted for connection at one end to a pump, an adapter detachably mounted on one end of said stator having a central opening therein for receiving a rotor shaft, a means in said adapter permitting limited interchange of liquid between a pump to which said adapter is connectable and the air gap formed by the coacting surfaces of said stator and rotor, a closure attached to the other end of the stator enclosing thrust bearing elements attached to said shaft, and a heat exchanger having its inlet and outlet respectively connected with cavities in opposite ends of the motor for absorbing heat transmitted thereto by a liquid adapted for circulation through the motor air gap.

2. A liquid cooled motor comprising a stator including windings hermetically sealed in a pressure vessel, a rotor having a shaft supported in guide bearings located adjacent opposite ends of the stator and of a length sufficient to permit attachment to a pump, a motor-pump adapter detachably mounted on one end of the stator and including a central opening designed to receive said shaft, flanges on said adapter permitting its attachment to a housing for a pump, means in said adapter allowing the seepage of liquid past the shaft and into the air gap formed by the coacting surfaces of the stator and rotor, a closure detachably connected to the other end of the stator and enclosing thrust bearing elements for the motor, means connecting a detachable heat exchanger to opposite ends of the motor for providing communication with the motor cavities so that liquid adapted for circulation through the motor is permitted to flow through the heat exchanger for transmitting heat thereto which is absorbed by the electrodynamically cooperating parts during motor operation.

3. A liquid cooled motor comprising a stator including a magnetic core and a winding therein enclosed in concentrically spaced elements, a pair of end rings on opposite ends of the stator closing the space between said elements and thereby providing a hermetically sealed stator component, a rotor in said stator supported on a shaft having one end projecting beyond the stator and positioned in guide bearings mounted adjacent opposite ends of the stator, an adapter secured to one of said end rings and equipped with a central opening including a construction about said shaft for limiting water interchange between the pump and motor, means in said adapter permitting the seepage of liquid past the adapter into the motor cavities and air gap formed by the rotor and stator, a closure secured to the end ring on the opposite end of the stator and enclosing thrust bearing elements associated with said shaft, a detachably mounted heat exchanger having its opposite ends respectively in communication with the cavities formed in the opposite ends of the motor, means on said shaft for circulating the liquid through the air gap, said cavities and the heat exchanger for transmitting heat thereto absorbed by said liquid during motor operation.

4. A liquid cooled motor comprising an assemblage of components individually detachable without affecting the disposition of other components in the motor comprising a stator and a rotor positioned therein and arranged for electrodynamic cooperation with each other, said rotor comprising a shaft having a magnetic core on its surface enclosed within a shell, said stator consisting of a cylindrical pressure vessel enclosing a magnetic core having a winding therein including winding end turns projecting outwardly from opposite sides of the core, a shell disposed on its inner surface and end rings closing the space between the inner shell and the pressure vessel thereby providing a hermetically sealed stator, an adapter detachably secured to one of said end rings and being of a design to support an end of the shaft arranged for coupling to a pump, said adapter including a flange adapted for connection to a pump housing, means interconnecting the flange with a second flange employed for securing the adapter to said end ring for providing a barrier restricting the flow of heat from a pump to the motor parts which operate at a lower temperature, a closure for the opposite end of the motor enclosing thrust and guide bearing elements associated with the shaft, a heat exchanger connected with opposite ends of the motor and having an inlet and outlet in communication with cavities in the motor, means in said adapter permitting the leakage of fluid from said pump into the air gap between the rotor and stator, and means on the shaft for circulating said fluid axially through the motor and said heat exchanger for transmitting heat to the latter absorbed by the fluid during motor operation.

5. A liquid cooled motor comprising an assemblage of components independently detachable from the others without disturbing the disposition of other parts of the motor comprising a stator including a magnetic core and windings having end turns extending outwardly therefrom, a pressure vessel enclosing said magnetic core and a shell disposed on the core inner surface and extending beyond the ends thereof, end rings on opposite ends of the core closing the space between the pressure vessel and the shell and secured to the pressure vessel by bolts for providing a hermetically sealed stator component, a shaft having a rotor component mounted on its surface positioned within the stator, a shell enclosing the rotor, shaft guide bearings at opposite ends of the stator for supporting the rotor, an adapter component detachably fixed by a second set of bolts to the end rings at one end of the stator, said adapter comprising a flange adapted for coupling to a pump housing and which is spaced by a member of small cross section from the point of connection to the end rings for providing a thermal barrier effective in restricting flow of heat from the pump to the motor which operates at a lower temperature, a closure component for the other end of the motor detachably connected to the pressure vessel by bolts, a lead seal in the walls of said pressure vessel for conducting leads from a power source to the stator winding, a heat exchanger component having its inlet and outlet ends respectively connected to opposite ends of the motor by bolts, means in said adapter permitting seepage of liquid in a predetermined amount from the pump into the motor cavities including the air gap, means on the shaft for circulating said liquid through the motor and said heat exchanger for transmitting heat thereto absorbed by the liquid during motor operation.

6. The combination according to claim 5 wherein disposable sealing means are positioned between the end ring and said adapter and the inner surface of the pressure vessel for respectively preventing leakage of liquid outward from the motor cavities and into the space occupied by the stator winding.

7. The combination according to claim 5 wherein an auxiliary heat exchanger is concentrically disposed on the outer surface of the pressure vessel for carrying away heat conducted thereto by the operating parts of the motor.

8. A liquid cooled motor comprising an assemblage of components independently detachable from the others without disturbing the other parts of the motor comprising a stator including a magnetic core and windings having end turns extending outwardly therefrom, a pressure vessel enclosing said magnetic core and a shell disposed on the core inner surface and extending beyond the ends thereof, end rings on opposite ends of the core closing the space between the pressure vessel and the shell and secured to the pressure vessel by bolts for providing a hermetically sealed stator component, a shaft having a rotor component mounted on its surface positioned within the stator, a shell enclosing the rotor, shaft guide bearings at opposite ends of the stator for supporting the rotor, an adapter component detachably fixed by a second set of bolts to the end ring at one end of the stator, said adapter comprising a flange for coupling the adapter to a pump housing and which is spaced from the point of connection to the end ring for providing a thermal barrier effective in restricting flow of heat from the pump to the motor which operates at a lower temperature, a closure component for the other end of the motor connected to the pressure vessel by bolts, a lead seal in the walls of the pressure vessel for permitting the entry of conductor leads from a power source to the stator winding, said lead seal comprising a copper stud for each of said conductors centrally positioned within a wall of the pressure vessel, an insulating sleeve over various portions of the stud extending outwardly from the wall and a ceramic insulator positioned over the stud within the wall, and means for preventing displacement of the seal outwardly when subjected to the high pressure forces of liquid in the motor cavities, a heat exchanger component connected by bolts to opposite ends of the motor and having its inlet and outlet ends respectively in communication with the motor cavities, means in said adapter permitting seepage of liquid in a predetermined amount from the pump into the motor cavities including the air gap, means on the shaft for circulating said liquid through the motor and said heat exchanger for transmitting heat to the latter absorbed by the liquid during its passage in the motor.

References Cited by the Examiner

UNITED STATES PATENTS

| | | | |
|---|---|---|---|
| 2,169,967 | 8/1939 | Smith | 174—152 |
| 2,309,670 | 2/1943 | Ruthman | 103—87 X |
| 2,598,547 | 5/1952 | Ivanoff | 103—87 |
| 2,622,537 | 12/1952 | Wortendyke | 103—87 |
| 2,687,695 | 8/1954 | Blom | 103—87 |
| 2,894,155 | 7/1959 | Lambastie | 310—54 |
| 2,964,659 | 12/1960 | Steele | 310—54 |
| 3,013,500 | 12/1961 | Bollibon | 103—87 |
| 3,043,903 | 7/1962 | Keane | 174—152 |

ORIS L. RADER, *Primary Examiner.*

DAVID X. SLINEY, *Examiner.*